March 18, 1952  R. A. McCONNELL  2,589,838
SINGLE SIDE BAND MODULATOR
Filed June 21, 1946
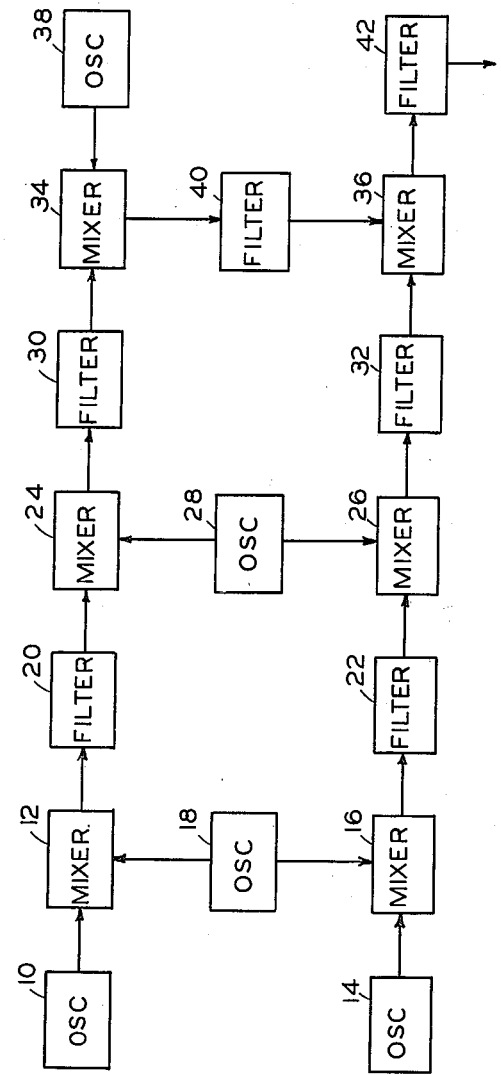
INVENTOR
ROBERT A. MC CONNELL
BY
*William D. Hall*
ATTORNEY Patented Mar. 18, 1952

2,589,838

UNITED STATES PATENT OFFICE 2,589,838

SINGLE SIDE BAND MODULATOR

Robert A. McConnell, Pittsburgh, Pa., assignor, by mesne assignments, to United States of America as represented by the Secretary of War Application June 21, 1946, Serial No. 678,222

5 Claims. (Cl. 343—9)

This invention relates to electrical apparatus and more particularly to single side band radio frequency modulators.

In many applications of electronics such as in radio communication systems or in radio object location systems it is desirable to provide a signal the frequency of which is the sum or difference of the frequencies of two signals. In conventional non-linear mixing circuits when two signals are mixed the output signal contains components of frequencies which are both the sum and the difference of the frequencies of the input signals. In many applications, as for example in a communication system wherein it is desired to conserve power it is advantageous to eliminate signal components of one of the two side band frequencies. This may be accomplished in a single side band modulator.

In the copending application to Bob E. Watt entitled "Airborne Moving Target Indicating Radar System," Serial No. 657,141, filed March 26, 1946, a method is described and apparatus disclosed for eliminating the indications normally produced in a radar or radio object locating system by objects which have a predetermined radial velocity relative to the radar system. For example, the radar system may be located in an aircraft and cancellation provided for those objects which are stationary relative to the earth. The radar system is one which is adapted to normally give an indication of all objects which are moving relative to the aircraft. This is accomplished by utilizing a coherent reference oscillation which is fixed in phase relationship to the transmitted signal from the radar system. This coherent reference signal is combined in an algebraic manner with the echo signals returned by objects surrounding the system. Stationary objects will produce, upon combination with the reference signal, constant amplitude signals. Moving objects will produce, upon combination with the reference signal, variable amplitude signals. The signals which vary in amplitude are separated from the signals which do not vary in amplitude and the former are utilized to provide the desired moving target indication. When it is desired to provide cancellation of signals returned by objects having a predetermined velocity relative to the radar system the phase of the reference signal must be continuously and linearly varied as a function of time. In the cited copending application this is achieved by altering the frequency of the coherent reference signal by an amount given by the equation $$F = \frac{2V_g \cos \delta}{\lambda} + Nr$$

In the above equation: F is the cycles per unit time change in the frequency of the coherent reference signal; $V_g$ is the ground speed of the aircraft measured in the same time units as the quantity F; $\delta$ is the angle between the ground track of the aircraft and the pointing of the radar antenna when the antenna is pointing at the object whose returned signal is to be cancelled or eliminated; $\lambda$ is the wavelength of the coherent reference signal measured in the same units of distance as is the quantity $V_g$; N is any integer including zero; and r is the repetition frequency of transmission from the radar system. The term Nr in the above equation is usually included because the first term on the right hand side of the equation may have very small values, even including zero. Therefore to permit adding of signals of this frequency to a signal of another frequency the first term on the right hand side of the equation is in effect added to a carrier of frequency Nr.

One difficulty which is encountered in using the above equation for determining the frequency increment, F, by which the coherent reference signal frequency is to be changed is that the equation includes the quantity r which, as hereinbefore stated, is the repetition frequency of transmission from the radar system. This requires that the repetition frequency be accurately known, and furthermore, that it be accurately controlled. It will be obvious that if the quantity r is determined and that if the quantity r then varies from the value used in the calculation there will occur false or inaccurate indications of moving targets.

It is an object of the present invention, therefore, to provide a novel single side band modulator capable of producing a signal which may be used to provide cancellation of objects having a predetermined velocity relative to a moving target indication radar system which cancellation is independent of the repetition frequency of the radar system.

It is a further object of the present invention to provide a novel single side band modulator capable of combining two signals the ratio of the frequencies of which may be large.

For a better understanding of the invention together with other and further objects thereof reference is had to the following description which is to be read in connection with the accompanying drawing which illustrates in block diagram form one embodiment of the present invention.

In the drawing an oscillator 10, operating at a frequency herein denoted as $(f'+F)$, is connected to a signal mixer 12. The quantity F is given by the equation 1 in which the integer N equals zero. The quantity $f'$ may be any convenient value as, for example, 50,000 cycles per second. An oscillator 14, operating at the frequency $f'$ is connected to a signal mixer 16. Oscillator 18, operating at a frequency herein denoted as $f_1$ is connected to supply signals to the mixers 12 and 16. The output of the mixers 12 and 16 are connected, respectively, to filters 20 and 22 and will contain signal components of frequencies $$(f'+F),$$
$$f_1,$$
$$f_1+(f'+F) \text{ and}$$
$$f_1-(f'+F)$$

and $$f',$$
$$f_1,$$
$$f_1+f', \text{ and}$$
$$f_1-f'.$$

respectively. The filters 20 and 22 are designed to select one of the upper or lower side band components of the signal applied thereto. In the present instance it will be assumed that the filters 20 and 22 are designed to pass the upper side band component and the frequency of the output signals will, therefore, be $f_1+(f'+F)$ and $f_1+f'$, respectively. The output of the filters 20 and 22 are respectively connected to mixers 24 and 26. An oscillator 28, operating at a frequency denoted by $f_2$, is connected to the mixers 24 and 26. The output of mixers 24 and 26 are respectively connected to filters 30 and 32 and will contain the signal components of frequencies $$f_1+(f'+F),$$
$$f_2,$$
$$f_2+(f_1+(f'+F)), \text{ and}$$
$$f_2-(f_1+(f'+F)),$$

and $$f_1+f',$$
$$f_2,$$
$$f_2+(f_1+f'), \text{ and}$$
$$f_2-(f_1+f'),$$

respectively. The filters 30 and 32 are designed to select one of the upper or lower side band components of the signal applied thereto. It will be assumed in this instance that the filters 30 and 32 select the upper side band component and the frequency of the output signals will therefore be $f_2+(f_1+(f'+F))$ and $f_2+(f_1+f')$, respectively. The output of the filters 30 and 32 are respectively connected to signal mixers 34 and 36. A second input to the mixer 34 is provided from an oscillator 38 operating at a frequency $f$. The oscillator 38 is the source of coherent reference signals which is normally used to provide moving target indication in the radar system. The output of the mixer 34 is applied to a filter 40 and will have signal components of frequencies $$(f_2+(f_1+(f'+F))),$$
$$f,$$
$$f+(f_2+(f_1+(f'+F))),$$
$$f-(f_2+(f_1+(f'+F))).$$

The filter 40 in this instance is designed to pass the upper side band component of frequency $f+(f_2+(f_1+(f'+F)))$. The output of the filter 40 is connected to the mixer 36. The output of the mixer 36 is applied to filter 42 and contains signal components of frequencies $$f+(f_2+(f_1+(f'+F))),$$
$$f_2+(f_1+f'),$$
$$(f+(f_2+(f_1+(f'+F))))+(f_2+(f_1+f')) \text{ and}$$
$$(f+(f_2+(f_1+(f'+F))))-(f_2+(f_1+f')).$$

The filter 42 is designed to select the lower side band components of the signal applied thereto. The frequency of this lower side band component as given above is $$(f+(f_2+(f_1+(f'+F))))-(f_2+(f_1+f')).$$

Removing the parenthesis and simplifying this latter expression the output of the filter 42 becomes $f+F$. It will thus be seen that the output of the filter 42 is the desired reference signal, the frequency of which has been altered from its normal value $f$ by the amount $F$ which is given in equation 1 above.

The above description illustrates the manner in which a signal may be obtained the frequency of which is the sum of the frequencies of the two signals. If it is desired to decrease the frequency of the signal from the oscillator 38 by an amount $F$, the filter 40 may be designed to pass the lower side band instead of the upper side band and the filter 42 is then designed to pass the upper side band instead of the lower side band as herein specified. It will be obvious that either the sum or difference signal may be obtained at the output of the filter 42 by other selections of the side bands which the filters 20, 22, 30, 32 and 40 are required to pass and therefore this invention is not limited to the particular sequence of selection of side bands described in this application.

In the above description of the present invention, two oscillators 18 and 28 have been employed. These two oscillators are used primarily to simplify the filtering problem. Although in the embodiment shown in the accompanying drawing only two such oscillators are used, it will be obvious to one skilled in the art that either or both of these oscillators may be eliminated or other oscillators together with associated mixers and filters may be added if the frequency differential between the modulation and the modulated signals is sufficient to warrant the alteration.

Although the above description of the present invention has been given with particular reference to its utilization in a moving target indication radio object locating system for the cancellation of signals returned from certain of the moving targets, it will be obvious that the apparatus may be used, without alteration, as a single side band modulator in a radio communications system. In this latter usage the quantity $F$ will be the modulation signal and the source of coherent reference signals will be the carrier frequency source. Therefore, while there has been described what is at present considered to be the preferred embodiment of the present invention, it will be obvious to those skilled in the art that various changes and modifications, in addition to those set forth above, may be made without departing from the scope of the invention.

What is claimed is:

1. In a moving target indication radio object locating system having means, including a coherent reference signal of wave length $\lambda$, for providing cancellation of indications from targets having a velocity, $V$, relative to said radio object locating system, apparatus for altering the frequency of said coherent reference signal by an amount $F=2V/(\lambda)$, said apparatus comprising first, second, third, fourth and fifth signal sources, said first and second signal sources being adapted to provide first and second audio frequency signals differing in frequency by said amount $F$, said third source providing said coherent reference signal, said fourth and fifth sources providing fourth and fifth signals, said fourth signal being intermediate in frequency to the frequencies of said first signal and said coherent reference signal, said fifth signal being intermediate in frequency to the frequencies of said fourth signal and said coherent reference signal, means providing sixth and seventh signals differing in frequency from said fourth signal by amounts respectively equal to the frequencies of said first and second signals, means providing eighth and ninth signals differing in frequency from said fifth signal by amounts respectively equal to the frequencies of said sixth and seventh signals, means providing a tenth signal differing in frequency from said coherent reference signal by an amount equal to the frequency of said eighth signal, and means providing an eleventh signal differing in frequency from said tenth signal by an amount equal to the frequency of said ninth signal whereby said eleventh signal differs in frequency from said coherent reference signal by said amount F.

2. In a moving target indication radio object locating system, having provisions, including a coherent reference signal of wave length $\lambda$, for providing cancellation of indications from targets having a velocity, V, relative to said radio object locating system, apparatus for altering the frequency of said coherent reference signal by an amount $F=2V/(\lambda)$, said apparatus comprising a first and a second signal source respectively providing first and second audio frequency signals differing in frequency by said amount F, a third signal source providing said coherent reference signal, a plurality of signal sources providing a first series of signals differing in frequency and adapted to divide the frequency range between the frequency of the said first audio frequency signal and the frequency of said coherent reference signal into substantially equal increments, means providing a second series of signals, the first signal of said second series differing in frequency from the first signal in said first series by an amount equal to the frequency of said first audio frequency signal, each succeeding signal in said second series differing in frequency from the preceding signal by an amount equal to the frequency of the corresponding signal in said first series, means providing a fourth signal differing in frequency from said coherent reference signal by an amount equal to the frequency of the last signal in said second series, means providing a third series of signals, the first signal of said third series differing in frequency from the first signal in said first series by an amount equal to the frequency of said second audio frequency signal, each succeeding signal in said third series differing in frequency from the preceding signal by an amount equal to the frequency of the corresponding signal in said first series, and means providing a fifth signal differing in frequency from said fourth signal by an amount equal to the frequency of the last signal in said third series whereby said fifth signal differs in frequency from said coherent reference signal by said amount F.

3. A modulator comprising a first and a second signal source respectively providing first and second audio frequency signals differing in frequency by an amount F, a third signal source providing a radio frequency signal, a plurality of signal sources providing a first series of signals of progressively increasing frequencies lying between the frequency of the said first audio frequency signal and the frequency of said radio frequency signal, means providing a second series of signals, the first signal of said second series differing in frequency from the first signal in said first series by an amount equal to the frequency of said first audio frequency signal, each succeeding signal in said second series differing in frequency from the preceding signal by an amount equal to the frequency of the corresponding signal in said first series, means providing a fourth signal differing in frequency from said radio frequency signal by an amount equal to the frequency of the last signal in said second series, means providing a third series of signals, the first signal of said third series differing in frequency from the first signal in said first series by an amount equal to the frequency of said second audio frequency signal, each succeeding signal in said third series differing in frequency from the preceding signal by an amount equal to the frequency of the corresponding signal in said first series, and means providing a fifth signal differing in frequency from said fourth signal by an amount equal to the frequency of the last signal in said third series whereby said fifth signal differs in frequency from said radio frequency signal by said amount F.

4. A single sideband modulator comprising two similar channels each consisting of a plurality of mixers and a plurality of single sideband filtering means interconnecting said mixers in cascade, a plurality of oscillators each connected in common to two corresponding mixers in said two channels, a source of oscillations of frequency $f_1$ connected to the first mixer of one channel and a source of oscillations of frequency $f_2$ connected to the first mixer of the other channel, a source of oscillations of frequency $f$ connected to the last mixer of said one channel, a single sideband filter connecting the output of said last mixer to the input of the last mixer of said other channel, and means for selecting a single sideband of the output of the last mixer of said other channel.

5. The modulator defined in claim 3, wherein the frequency of the oscillators is greater than $f_1$ and $f_2$ and less than $f$, and $f_1$ and $f_2$ are audio frequencies and $f$ is a radio frequency.

ROBERT A. McCONNELL.

REFERENCES CITED

The following references are of record in the file of this patent:

UNITED STATES PATENTS

| Number | Name | Date |
| --- | --- | --- |
| 2,272,068 | Pollack | Feb. 3, 1942 |

FOREIGN PATENTS

| Number | Country | Date |
| --- | --- | --- |
| 409,115 | Great Britain | Apr. 26, 1934 |